W. WILLIAMS.
REVOLVING TEETER BOARD.
APPLICATION FILED FEB. 3, 1919.

1,339,536.

Patented May 11, 1920.

INVENTOR
Winfield Williams
BY John A. Naismith
HIS ATTORNEY

500# UNITED STATES PATENT OFFICE.

WINFIELD WILLIAMS, OF SAN JOSE, CALIFORNIA.

REVOLVING TEETER-BOARD.

1,339,536.

Specification of Letters Patent.

Patented May 11, 1920.

Application filed February 3, 1919. Serial No. 274,674.

*To all whom it may concern:*

Be it known that I, WINFIELD WILLIAMS, a citizen of the United States, and a resident of San Jose, in the county of Santa Clara and State of California, have invented certain new and useful Improvements in Revolving Teeter-Boards, of which the following is a specification.

My invention relates to a form of teeter-board construction in which the board itself is pivotally mounted upon a horizontal axis, the said axis being revolubly mounted upon a stationary table.

The object of my invention is to provide a device of the character indicated that will have free movement about both vertical and horizontal axes, that will be simple in construction, strong and durable. Another object of my invention is to provide a device of the character indicated in which the several parts are securely locked together when in an operative position, and that may be easily assembled or taken apart, cheap to manufacture, and capable of being packed for shipping or stored in small space.

With these and other objects in view my invention consists in the novel and useful provision, formation, construction, combination and relative arrangement of parts, members and features, all as hereinafter described, shown in the drawings, and finally pointed out in the claims.

In the drawings:—

Similar characters of reference indicate similar parts throughout the several views.

Figures 1, 2:
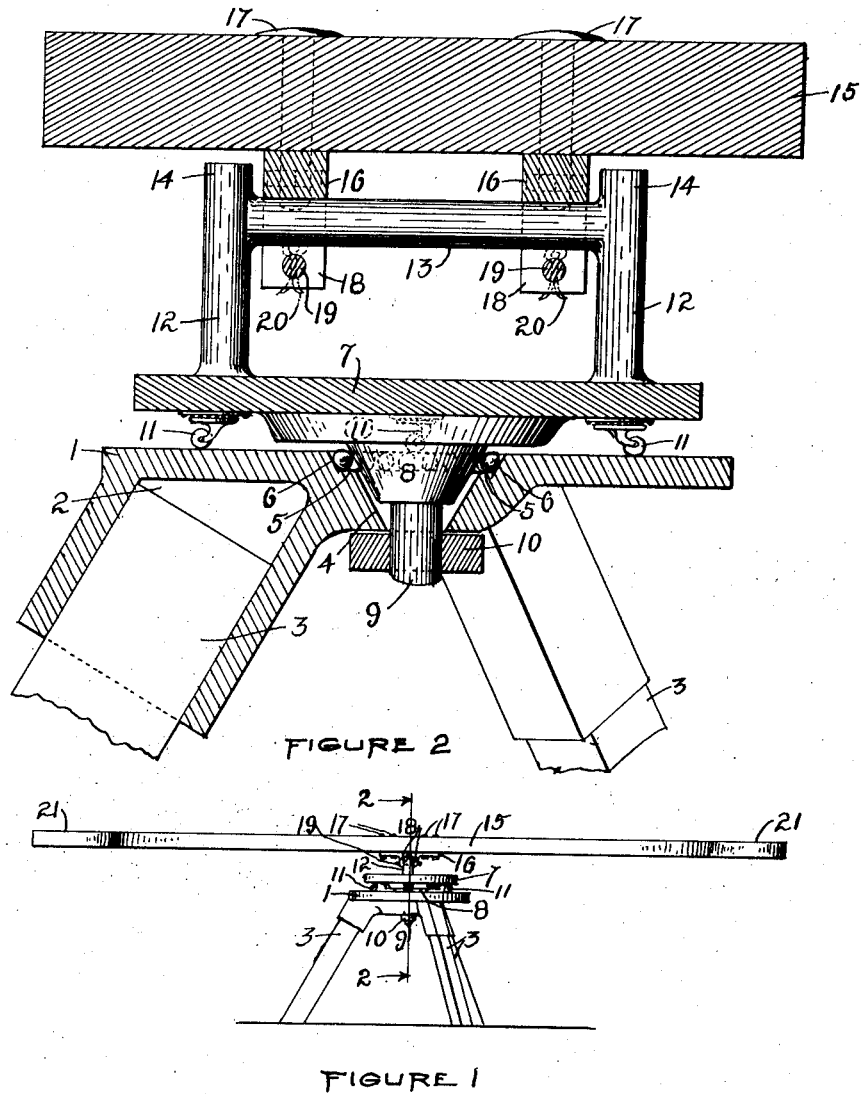
Figure 1 is a side elevation of my improved revolving teeter-board mounted ready for use.
Fig. 2 is a sectional view on line 2—2 of Fig. 1.

Referring now more particularly to the drawings, 1 indicates a table having sockets 2 formed in the under side thereof to receive supporting legs 3. In the center of table 1 is formed, at 4, a circular cone-shaped socket passing therethrough and having a raceway 5 formed therein to receive balls 6, the raceway or shoulder 5 serving to maintain said balls 6 in alinement in a horizontal plane. At 7 is shown a member having a cone-shaped bearing 8 projecting from the center of its lower surface and adapted to enter socket 4 and engage balls 6, pin 9 projecting from the lower surface of bearing 8, extending beyond the lower surface of table 1 and having a nut 10 screwed thereon, thereby preventing the displacement of bearing 8 when the device is in use. In the present instance member 7 is also provided with a plurality of casters 11 mounted upon its under surface and operating upon table 1 when the member 7 is rotated, thereby assisting in holding member 7 in parallel relation to table 1 at all times. Formed integrally with member 7 and on the upper side thereof, are vertical supports 12—12 joined by an axle 13, vertical extensions of supports 12—12 being shown at 14—14 for the purpose hereinafter specified.

The teeter-board or rocking member is shown at 15, the same being mounted upon axle 13 in the following manner. Bearings 16—16 are secured to the central portion of the under side of board 15, parallel with its longer axis and so placed and spaced as to engage axle 13 between the extensions 14. Each bearing 16 is secured to board 15 by bolts 17 and is provided with two ears extending below axle 13, one on each side thereof as at 18—18, a bolt 19 passing through both of said ears and held in position by cotter-pin 20. The seat portions of board 15 are indicated at 21.

In a construction of this nature the board 15 operates freely upon horizontal axle 13; it is held against lateral movement by projections 14; it is readily removed from axle 13 when desired and yet is prevented from being accidentally thrown off of said axle by bolts 19. Likewise member 7 with board 15 supported thereon is freely movable about a vertical axis; its own weight normally holds it in position on balls 6 and it is held against accidental displacement by pin 9 and nut 10 in conjunction with the under side of table 1; operating upon ball bearings 6 and casters 11 it cannot tip sidewise. In addition to these advantages the combined roller bearings and casters distribute the varying superimposed weights in such a manner that its freedom of movement is never greatly impaired. Also the ball bearing construction is such that it forms a thrust bearing, the weight of the superstructure being carried to the table 1 at a substantial angle to the axis of the bearing whereby great freedom of action is secured with a minimum of mechanical complication, and an automatic compensation for the wearing away of the bearing is provided. It is also pointed out that member 7 and bearing 8 are sufficient in themselves to prevent the balls 6 from working out at the top of socket 4.

It is understood of course that changes in form, proportions and details of construction may be made within the scope of the appended claims.

I claim:—

1. A device of the character described, comprising a rigidly mounted table having an inverted conical opening formed in the center thereof, said opening having an annular and substantially horizontal shoulder formed therein and concentric therewith, balls positioned to rotate freely in said shoulder, a conical member mounted to rotate freely on said balls, means for preventing the vertical displacement of said rotating member, a horizontal axle rigidly mounted on said conical member, and a rocking member provided with terminal seats balanced upon said axle.

2. A device of the character described, comprising a rigidly mounted table having an inverted conical opening formed in the center thereof, said opening having an annular and substantially horizontal shoulder formed therein and concentric therewith, balls positioned to rotate freely on said shoulder, a conical member mounted to rotate freely on said balls, a horizontal axle rigidly mounted on said conical member, and a rocking member provided with terminal seats balanced upon said axle.

3. A device of the character described, comprising a rigidly mounted table having an inverted conical recess formed in the center thereof and an inverted conical opening of less diameter than said recess and concentric therewith connecting said recess with the lower surface of said table, balls positioned to rotate freely in said recess and about said conical opening, a conical member mounted to rotate freely on said balls, a horizontal axle rigidly mounted on said conical member, and a rocking member provided with terminal seats balanced upon said axle.

4. A device of the character described, comprising a rigidly mounted table having an inverted conical opening formed in the center thereof, said opening having an annular and substantially horizontal shoulder formed therein and concentric therewith, balls positioned to rotate freely on said shoulder, a member provided with a conical bearing adapted to rotate freely on said balls and a plurality of bearings adapted to rotate freely on the upper surface of said table, a horizontal axle rigidly mounted on said member and a rocking member provided with terminal seats balanced on said axle.

5. A device of the character described, comprising a rigidly mounted table having an inverted conical recess formed in the center thereof and an inverted conical opening of less diameter than said recess and concentric therewith connecting said recess with the lower surface of said table, balls positioned to rotate freely in said recess and about said conical opening, a member provided with a conical bearing adapted to rotate freely on said balls and a plurality of bearings adapted to rotate freely on the upper surface of said table, a horizontal axle rigidly mounted on said member and a rocking member provided with terminal seats balanced on said axle.

6. A device of the character described, comprising a rigidly mounted table having a circular horizontally disposed top surface and having an inverted conical recess formed in the center thereof and an inverted conical opening of less diameter than said recess and concentric therewith connecting said recess with the lower surface of said table, balls positioned to rotate freely in said recess and about said conical opening, a member provided with a conical bearing adapted to rotate freely on said balls and spaced a distance above said table and provided with a plurality of bearings adapted to rotate freely upon the upper surface of said table, a horizontal axle rigidly mounted on said rotating member, and a rocking member provided with terminal seats balanced upon said axle.

In testimony whereof I have hereunto affixed my signature this 25th day of January, 1919.

WINFIELD WILLIAMS.